April 5, 1932.                J. P. READ                1,852,375
                            EMBLEM HOLDER
                         Filed Dec. 10, 1930
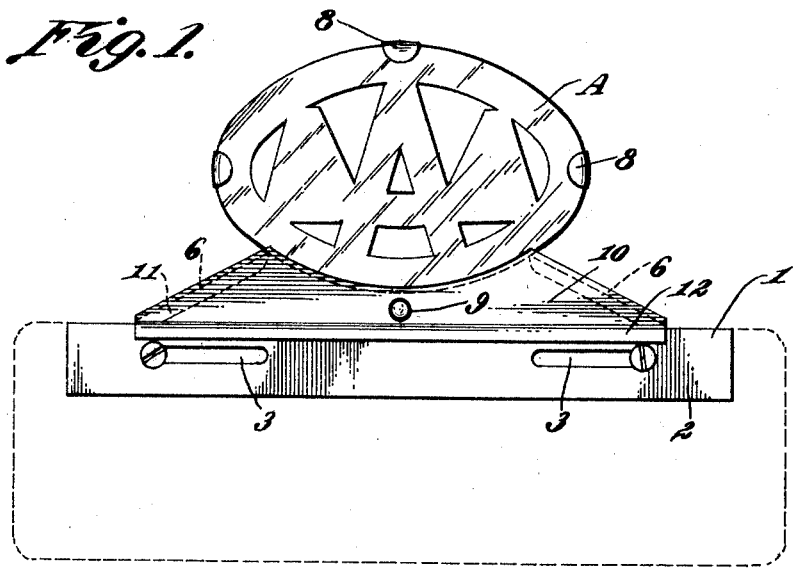
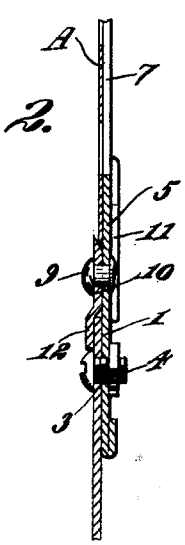
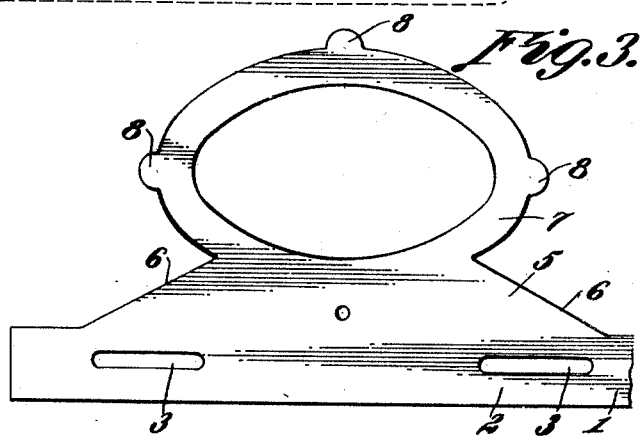
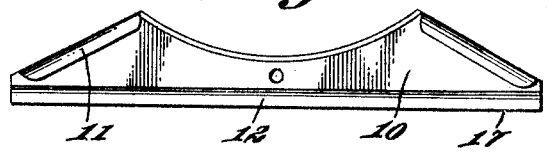
John P. Read,
INVENTOR
BY Victor J. Evans
ATTORNEY
WITNESS: William Thompson Patented Apr. 5, 1932

1,852,375

UNITED STATES PATENT OFFICE

JOHN P. READ, OF NASHVILLE, TENNESSEE

EMBLEM HOLDER

Application filed December 10, 1930. Serial No. 501,365.

This invention relates to emblem holders and its general object is to provide an emblem holder that is primarily designed for associating an emblem with a motor vehicle and especially to the license tag thereof, in a manner whereby the emblem is not only displayed so that it will be readily seen by a casual observer, but is held against casual displacement, and fear of it becoming loose or being lost is eliminated.

A further object of the invention is to provide an emblem holder that is simple in construction, inexpensive to manufacture and apply, and extremely efficient in operation and service.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a front elevation illustrating my emblem holder applied to a license tag of a motor vehicle, with an emblem associated therewith.

Figure 2 is an enlarged fragmentary sectional view taken approximately on line 2—2 of Figure 1.

Figure 3 is a view of the body portion of my emblem.

Figure 4 is a view of a clamping plate therefor.

Referring to the drawings in detail, the reference numeral 1 indicates the body plate which as shown includes a base strip 2 that has its lower edge folded upwardly upon itself and disposed in engagement therewith to materially reinforce the strip as will be apparent. The strip is provided with slots 3 adapted to receive bolt and nut connections 4 whereby the emblem is secured to the license tag as shown in Figure 1.

Formed with the strip 2 and rising therefrom is an intermediate portion 5 that is provided with inclined side edges 6 for a purpose which will be presently apparent, and formed with the intermediate portion is a frame 7 that is substantially oval shape in configuration for the purpose of accommodating a like shape emblem A as shown in Figure 1. The frame 7 is provided with an upper and side clamping ears 8.

The intermediate portion is provided with an opening midway its ends to accommodate a rivet or other like securing means 9 that secures the clamping plate 10 to the body plate and this clamping plate has a rounded upper edge that follows the curvature of the frame as shown. Formed with the side edges of the clamping plate 10 are flanges 11 that are folded and arranged in parallelism with the clamping plate for the purpose of receiving the side edges 6 of the body plate, and the flanges 11 cooperate with the rivet or like securing means 9 for rigidly fixing the clamping plate to the body plate as will be apparent.

The upper edge of the clamping plate is slightly spaced with respect to the frame so as to allow the emblem to be disposed between the clamping plate and frame, and the upper edge of the clamping plate co-operates with the ears 8 for securing the emblem to the holder, the ears being bent into contacting engagement with the emblem, so that casual displacement of the latter will be prevented.

The lower edge of the clamping plate is provided with an outwardly flared flange 12 that is disposed in spaced relation with respect to the strip 2 whereby the upper edge of the license tag will fit between the strip 2 and flange 12.

From the above description and disclosure of the drawings, it will be obvious that I have provided an emblem holder that will not only rigidly secure an emblem with respect to the license tag of a motor vehicle, but will display the emblem in a conspicuous manner, so that it will be readily seen by a casual observer.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. An emblem holder comprising a body plate, a base strip included in said body plate and being provided with slots arranged in alignment, an intermediate portion having inclined side edges, a frame formed with the intermediate portion, a clamping plate having flanges disposed in clamping engagement with the inclined side edges, means cooperating with the flanges for securing the clamping plate to the body plate, and ears cooperating with the clamping plate for securing an emblem to the frame.

2. An emblem holder comprising a body plate, a base strip formed with said body plate, an intermediate portion formed with and rising from said base strip and having inclined side edges, a frame formed with the intermediate portion and rising therefrom, a clamping plate, flanges formed with the side edges of the clamping plate and being bent to provide clamping means to accommodate the side edges of the intermediate portion, said clamping plate having a curved upper edge disposed in spaced relation with respect to the frame to accommodate an edge of an emblem, ears cooperating with the clamping plate for securing an emblem to the frame, and a flange formed with the lower edge of the clamping plate and disposed in spaced relation with respect to the base strip for receiving a license tag.

In testimony whereof I affix my signature.

JOHN P. READ.